United States Patent [19]

Alafandi et al.

[11] 4,234,457
[45] Nov. 18, 1980

[54] CRYSTALLIZED SILICA-ALUMINA COGEL AND CATALYST EMPLOYING THE SAME

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 44,324

[22] Filed: Jun. 1, 1979

Related U.S. Application Data

[63] Continuation-in-part of Ser. No. 935,628, Aug. 21, 1978, Ser. No. 3,879, Jan. 16, 1979, Ser. No. 9,487, Feb. 5, 1979, Ser. No. 718,167, Sep. 9, 1976, Pat. No. 4,058,484, Ser. No. 402,448, Oct. 1, 1973, Pat. No. 4,065,069, Ser. No. 869,856, Feb. 3, 1978, Pat. No. 4,192,778, and Ser. No. 874,754, Feb. 3, 1978.

[51] Int. Cl.³ ............... B01J 27/24; B01J 27/02; B01J 29/06
[52] U.S. Cl. ................... 252/438; 252/440; 252/455 R; 252/455 Z
[58] Field of Search ............ 252/438, 440, 455 R, 252/455 Z

[56] References Cited

U.S. PATENT DOCUMENTS

| | | | |
|---|---|---|---|
| 3,173,854 | 3/1965 | Eastwood et al. | 252/455 Z |
| 3,346,512 | 10/1967 | Gladrow et al. | 252/455 Z |
| 3,423,332 | 1/1969 | Maher et al. | 208/120 |
| 3,437,604 | 4/1969 | Micholko | 252/455 Z |
| 3,536,604 | 10/1970 | Jaffe | 252/455 Z |
| 3,551,509 | 12/1970 | Thomas et al. | 252/455 Z |
| 4,085,069 | 4/1978 | Alafandi et al. | 252/455 Z |
| 4,139,493 | 2/1979 | Mickelson | 252/455 R |
| 4,142,995 | 3/1979 | Alafandi et al. | 252/455 Z |

*Primary Examiner*—Delbert E. Gantz
*Assistant Examiner*—William G. Wright
*Attorney, Agent, or Firm*—Philip Subkow; Bernard Kriegel

[57] ABSTRACT

This invention relates to alpha $(Si, Al)O_4$ crystalline complex, and to silica-alumina gel and crystalline alumino silicate host containing said alpha $(Si, Al)O_4$ complex; both gels and crystalline alumina silicates containing a novel crystalline phase resulting from the hydrothermal treatment of the host $(Si, Al)O_4$ complexes, both amorphous gel and crystalline alumino silicates, in the presence of rare earth cations.

15 Claims, No Drawings

CRYSTALLIZED SILICA-ALUMINA COGEL AND CATALYST EMPLOYING THE SAME

BACKGROUND OF THE INVENTION

This application is a continuation-in-part of application, Ser. No. 935,628; filed Aug. 21, 1978, and application Ser. No. 3,879; filed Jan. 16, 1979, and Ser. No. 9,487; filed Feb. 5, 1979, Ser. No. 718,167 filed Sept. 9, 1976 now U.S. Pat. No. 4,058,484, Ser. No. 402,448, filed Oct. 1, 1973, now U.S. Pat. No. 4,065,069, Ser. No. 869,856, filed Feb. 3, 1978 now U.S. Pat. No. 4,192,778, and Ser. No. 874,754, filed Feb. 3, 1978.

Prior to the introduction of the exchanged crystalline zeolites of the faujasite type, as a catalyst for cracking of hydrocarbons, a commonly used catalyst was composed of a silica-alumina cogel containing from about 3 to about 25 percent by weight of $Al_2O_3$ on a volatile free basis.

Because of the substantially higher activity of the catalyst formed from faujasite type crystalline alumino silicate zeolites, they have replaced to a large measure the silica-aluminum cogels as the primary component of a hydrocarbon conversion catalyst.

The literature relating to a silica-alumina gels and their catalytic properties is extensive (see Iler, "The Colloid Chemistry of Silica and Silicates", Chapter VI, Cornell Press [1955] Ed.) and citations there given. Milliken, et al., "Discussions Faraday Society" No. 8, "Heterogeneous Catalysis" p. 279, etc. (1950) Mills, et al., Journal of the American Chemical Society, vol. 72, pp. 1554–1556 (1950). See also: Erickson, U.S. Pat. No. 2,872,410; Winyall, U.S. Pat. No. 2,886,512; Wilson, U.S. Pat. No. 3,124,541; Magee, et al., U.S. Pat. No. 3,433,748; Haden, U.S. Pat. No. 3,065,054; Maher, et al, U.S. Pat. No. 3,423,332; Lussier, et al, U.S. Pat. No. 3,974,099.

The literature relating to such crystalline alumina silicates and catalysts incorporating the same is also extensive. See: Breck "Zeolite Molecular Sieves" (1974) John Wiley and Sons, Rabo "Zeolite Chemistry and Catalyses" ACS Monogrape 171.

The techniques for carrying out exchanges in the prior art have been described in the prior art (see Rabo, "Zeolite Chemistry and Catalysis", pages 309 and 310 published by the American Chemical Society in 1976 and see also U.S. Pat. Nos. 3,293,194, 3,402,996, 3,867,277, 3,281,199, 3,169,692, and 2,463,608). Such procedure has also been reported when using an X type zeolite (see U.S. Pat. No. 3,966,882). The literature in this art is extremely voluminous and this statement of the art is not intended to be exhaustive.

FIELD OF THE INVENTION

This invention relates to crystalline compositions composed of silicon, aluminum and oxygen atoms in crystal form whose characteristic x-ray spectra contains 2 theta reflection corresponding to "d" spacings as herewith set forth in Table 1, infra. The crystal phase is herein referred to as "alpha". This invention also related to silicon, aluminum and oxygen complex either in the form of silica-alumina cogel or crystalline alumino silicates which contain the alpha crystal phase as above and which acts as a host for the alpha crystal phase. The crystalline phase has a structure which is different from the structure of the host, whether an amorphous gel or a crystalline alumino silicate. Prior to treatment according to our invention, it did not contain the structure corresponding to that having a x-ray defraction pattern which contains reflections according to Table 1.

In the above referred to parent applications, we have described our invention for hydrothermal treatment of crystalline alumino silicates and of silica-alumina cogels whereby improved activity of the treated material was obtained.

The said application Ser. No. 3,879; filed Jan. 16, 1979, is incorporated herein by this reference.

STATEMENT OF THE INVENTION

In the case of the silica-alumina cogel and the crystalline alumino silicates, the coordination of the silicon and aluminum ions with oxygen are in what may be termed (Si, Al)$O_4$ complexes have similarities corresponding to Lowenstein's Rules. The similarity is such as to permit the identification of the gel as amorphous alumino silicates (AAS) to contrast them with crystalline alumino silicates (CAS). See Breck, supra, pages 29, 93, and 94; and Iler, supra, page 262. For purposes of this specification and claims, we will refer to the host whether the gel (AAS) or the crystalline form (CAS) as (Si, Al)$O_4$ complexes.

The basic structure of the crystalline alumino silicate consists of $Si^{4+}$ ions in tetrahedral coordination with four (4) oxide ions and $Al^{3+}$ ions. The aluminum ion coordinates tetrahedrally as well as octahedrally in an alumino-silicate (see Breck, supra, page 29). In the case of the alumino-silicate of the faujasite type, the arrangement is a diamon-like array of linked sodalite units. This structure contains (Si, Al)$O_4$ tetrahedra which are joined tetrahedrally (see Breck, supra, pages 93 and 94). The silica-alumina gels have a similar linkage in that the silicon, aluminum and oxygen atoms are joined in (Si, Al)$O_4$ tetrahedra more randomly distributed (see Iler, supra). The silica-alumina gels, following Iler, may be referred to as amorphous alumino silicates.

We have discovered that both the gel and the crystalline alumino silicate according to our invention may generate an in-situ crystal phase which we have designated as "alpha" and which is characterized by an organization of the silicon, aluminum and oxygen atoms so as to give an x-ray spectrum which is substantially different from the structure of the host, that is the gel or the crystalline alumino silicate from which it is generated by the process of our invention.

Our invention relates to a composition of matter comprising a complex of silicon, aluminum and oxygen atoms which may be generated by hydrothermal treatment with rare earth cations under acid conditions either from a silica-alumina cogel or from a crystalline alumino silicate particularly those of the faujasite type, which we have designated "alpha".

The particular group of the complexes which form the starting point for the subject matter of our present invention are those which show zeolite properties in the sense that they have the capacity to bind cations. The particular form of the (Si, Al)$O_4$ complex which constitutes the subject matter of our present invention are those containing the alpha complex in a host which is either a crystalline alumina silicate or a silica-alumina cogel. The cogel which is to be treated to form a host for the alpha crystalline phase according to our invention has a silica to alumina molar ratio of more than 1 and less than 3, and the particular alumino silicate which forms the preferred crystalline alumino silicate according to our invention is those of the faujasite type to wit the so called X or Y zeolites. These are well known crystalline alumino silicates generally characterized as of the faujasite type because of their similarity with mineral faujasites and form a regular system varying in $SiO_2/Al_2O_3$ ratio from 2 to 6 or more and the cubic system referred to above with a range of $a_o$ values. (See Milton, U.S. Pat. No. 2,882,244; and Breck, U.S. Pat. No. 3,13,007; and see also Breck, supra.)

We have discovered that high temperature treatment of the above gels or crystalline alumino silicate under acid conditions in the presence of rare earth cations generates in said silicon, aluminum, oxygen complexes the same characteristic crystalline phase, irrespective of whether the host is the silica-alumina gel, or the X or the Y zeolite. The resultant crystal phase as represented by x-ray spectra has substantially the same characteristic reflections indicating planes of substantially the same "d" spacings here designated as alpha. The complexes thus produced acting as a host to contain the alpha crystalline phase have a substantially improved catalytic activity as compared to the host from which they are derived.

This improvement accompanying the generation of the alpha phase is obtained when the digestion is carried out above the atmospheric boiling point of the rare earth solution for a controlled period of time. Excessive digestion time and excessive ratios of rare earth cations acts to transform the crystal phase, characterized by spacings of Table 1 (infra), into a different form which may have inferior catalytic activities as compared with a complex having the crystal phase of Table 1 although superior to the original host material. The common set of "d" spacings identifies a component present in the hydrothermally treated silica-alumina complex which is thus a combination, whether crystalline or gel and a separate crystal phase. It is a composition of matter which has improved the catalytic activity of the host.

The new alpha crystal phase is characterized by a reflection of 2 theta angular value corresponding to the following characteristic "d" spacings as derived from an x-ray spectra employing K alpha copper radiation.

Table 1

| d (Angstroms) |
| --- |
| 6.25 ± 0.1 |
| 4.58 ± 0.08 |
| 3.56 ± 0.04 |
| 3.14 ± 0.02 |
| 3.005 ± 0.02 |
| 2.84 ± 0.02 |

Depending on the conditions of the hydrothermal treatment, additional lines may appear. Some of the intensities of the reflections corresponding to the above "d" spacings may be amplified and others diminished.

The spectrum according to Table 1 is distinguished from that of the above host faujasite type crystalline alumino silicates, and from the crystalline alumino silicates containing such lines as described by Breck, supra.

While "d" spacings, some of which are found in the above Table, may also be found among others in various crystalline alumino silicate systems, for example in the spectra of baJ, reported at page 360, of Breck, supra, zeolite N, reported at page 364, Offertite at page 365, and Z21 at page 370 of supra. They are part of different crystal system and are found together with the other d values characteristic of the spectrum of each different system.

The alpha crystal phase appears to be a unique composition of matter which is associated with an improved cracking activity of the host.

The hydrothermal treatment according to our invention of ammoniated silica-alumina cogel under acid conditions in the presence of a rare earth cation under conditions to develop an in situ crystalline phase produces a deammoniated gel of improved catalytic activity. The treatment results in a reduction in the content of ammonium cation associated with the gel and in the introduction of the polyvalent cations. The treatment under controlled hydrothermal conditions may result in the generation of an in-situ crystalline phase. Under less intense hydrothermal conditions, no crystalline phase appears, and the gel remains amorphous. The treated gel, reduced in ammonium ion content carries associated therewith rare earth cations. In our preferred embodiment, it will have catalytic activity which is superior to the original cogel.

The cogel which we prefer to treat by the process of our invention to form the catalyst of our invention may be produced by any of the methods used in the prior art to form such cogels in which the treatment results in a gel having an ammonium ion associated with the gel. Such procedures are well known in this art.

The catalytic activity of the exchanged cogel of our invention is improved by controlling the silica to alumina ratio of the cogel. The catalytic activity attainable by our invention is substantially greater as the molar ratio of $SiO_2/Al_2O_3$ is less than 3 and preferably more than 1. For purposes of producing the crystalline phase in the alumina-silica gel according to our invention, the preferred ammoniated cogel is one containing a silica-alumina cogel of more than 1 and less than about 2 to produce a hydrothermally treated gel having a $SiO_2/Al_2O_3$ molar ratio in the range of more than 1 and less than 2 for example, as in the examples infra, about 1.5 to about 1.7.

The crystalline alumino silicate subjected to the hydrothermal treatment of our invention to generate the crystalline phase of the present invention are preferably the faujasite type zeolites of the X or Y type, supra, hydrothermally reacted with rare earth cations under acid conditions.

The crystalline phase, when produced by hydrothermal treatment of the gel under various conditions in the presence of rare earth cations has a characteristic in common in that the lattice has "d" spacings as set forth in Table 1. The x-ray pattern may contain peaks which depart from the above pattern due to differences in treating conditions, distortions or instrumental artifacts as will be understood by those skilled in this art.

The exchanged gel which contains the cogel as a matrix for the in-situ generated crystalline phase, may be combined with additional matrix material, such as clays, for example, kaolin, ball clay, or halloysite, or acid treated halloysite, or inoganic oxides such as silica gel, or for example, the hydrated aluminas such as pseudoboehmite. Such matrix materials may be used in ratios of from about 5% to 95% of the mixture of the exchanged gel of our invention and the matrix on a volatile free basis. They may be also combined with the zeolites which have been used in the prior art as cracking catalysts including also the matrix material employed in the prior art with such zeolites.

The index of merit as to activity of cracking catalysts is the volume percent conversions determined by a microactivity test herein identified. The higher the volume percent conversion, after various temperature levels of high temperature steaming, the more active is the catalyst.

The activity may be measured by the microactivity cracking test described in the Oil and Gas Journal of Sept. 26, 1966, page 84, etc., and Nov. 22, 1975, page 60, etc.

In the following examples where activity is referred to the above test is employed, the conditions were as follows. The calcined pelleted catalyst was first steamed at temperatures and times specified below and then used in cracking of a petroleum fraction under the following conditions. Oil charge was a wide boiling range high sulfur feed stock (boiling range about 430° to 1000° F.). The catalyst to oil ratio equals 4. The weight hourly space velocity equals 16.45 grams of oil per gram of catalyst per hour. The temperature of the reactor is 910° F. The percent conversion is reported as percent by volume of liquid charge. The percent conversion after calcination of the catalyst in air three hours at 1050° F. and steamed for 2 hours at 1450° F. prior to testing, the percent conversion is reported as M activity. Another sample is steamed for 2 hours at 1500° F., and the volume percent conversion is reported as S activity. When another sample is steamed for 1550° F., for 2 hours prior to testing, the volume percent conversion is reported as S+ activity.

The ammoniated gel is reacted with the rare earth salt solutions at an acid pH in the range of about 4 to less than about 6 so that the rare earth ions are not precipitated as a separate compound and the rare earth cations become associated with the gel.

For purposes of describing the result of the process of treating the ammoniated gel with a water solution of the rare earth salt, whereby the $NH_4$ content of the gel is reduced, we refer to the process as an "exchange" and the cations as "associated with the gel."

The preferred exchange results in the production of a silica-alumina cogel which has a sodium content of less than 1% and preferably less than 0.5% by weight of the gel expressed as $Na_2O$ on a volatile free basis, and a $NH_4$ content of less than about 0.3 equivalents of $NH_4$ per mole of $Al_2O_3$ in the gel. Preferably the $NH_4$ content is less than about 0.1 equivalents per mole of $Al_2O_3$.

The exchange in the case of rare earth cations is carried out to associate the rare earth expressed as ReO, in the range of about 0.1 to about 0.4 equivalents per mole of $Al_2O_3$ in the treated cogel. Preferably, the exchange is conducted at a temperature in excess of the atmospheric boiling point and for a period of time and concentration of reactants so as to develop a crystal structure whose x-ray pattern is characterized by reflections which include the following "d" spacings of Table 1.

Depending on the duration of treatment, additional lines may appear and the intensities of the corresponding peaks may, as to some, be amplified, and as to others, they may be diminished.

For purposes of forming a catalyst for conversion of hydrocarbons such as petroleum fractions, we prefer to hydrothermally treat the ammoniated silica-alumina cogel or the faujasite type zeolite in the presence of a water solution of the rare earth salts at above the atmospheric boiling point, for example, about 250° F. to about 450° F., under superatmospheric pressure in a closed vessel for a time to develop an x-ray structure containing the "d" spacings of Table 1.

A prolongation of treatment or treatment at more elevated temperature results in the development of lines in addition to those corresponding to Table 1.

More rigorous conditions of treatment of the ammoniated cogel for example at temperatures substantially in excess of about 400° F., i.e. 500° to 550° F., may result in the generatiaon of a crystalline phase whose x-ray spectrum contains a substantial number peaks which do not appear in the x-ray spectrum of the crystalline phase generated at lower temperatures or in less reaction time, for example the "d" spacings of Table 1. Extended digestion at the higher temperatures results in the formation of a crystalline phase in which the planes developed at lower temperatures do not appear in the x-ray spectrum or appear at a reduced intensity. Some peaks are of lowered intensity and others are missing as compared with the x-ray pattern of the gel exchanged at lower temperatures or for shorter periods of time. The activity of the gel treated at the lower temperature is materially greater than that treated at the higher temperature. (See our copending application, Ser. No. 3,879; filed Jan. 16, 1979 which is herewith incorporated by reference.)

According to the invention of the present application, in the hydrothermal treatment of crystalline aluminosilicate, we prefer to employ in the case of the X or Y zeolite, rare earth cations. In the case of Y we may also use both $NH_4$ and rare earth in sequence, first $NH_4$ and then rare earth. In the case of the X zeolite, we prefer to employ the rare earth and not the ammonium cation.

We accomplish this result by exchanging the zeolite of the faujasite type (X and Y), by a process of exchange of the sodium in the faujasite zeolite at a temperature far in excess of the temperatures of the boiling point of the reaction solution at atmospheric pressure. This temperature is attained by maintaining the reaction mixture in the exchange solution at superatmospheric pressures. The resultant zeolite, preferably after being washed substantially free of the anions of the exchange salt, may be incorporated into a matrix as will be described below.

In the process according to our invention, the sodium zeolites of the faujasite type are mixed with a solution of a salt of the rare earth cation to be exchanged for the sodium of the zeolite and at a pH adjusted to between about 3 and less than about 7. The mixture is exchanged at superatmospheric pressure so as to cause the exchange to occur at temperatures about 250° F. to about 450° F. We have also found that in order to produce the zeolites containing the alpha crystalline phase of our invention and a low sodium level, for example, in the range of 1% or less, expressed as $Na_2O$ based upon the weight of the volatile free (VF) zeolite without a substantial destruction of the crystallinity of the zeolite but rather with the generation of our new crystalline phase, it is desirable to maintain a high ratio of the equivalents of the rare earth cation to the sodium in the zeolite.

The ratio of the equivalents of the rare earth cation, in the solution employed, to the equivalents of sodium originally in the zeolite charged to the reaction mixture, depends on the level of the residual Na which is to be attained. We prefer to carry out the reaction for exchange to levels of Na, as $Na_2O$ of about 1% or substantially less, to produce an exchanged zeolite with the rare earth cation. We may obtain this ratio by adjusting the concentration of the zeolite solids in the reaction mixture and the concentration of the rare earth cation entering the exchange.

Under these conditions, we have been able to obtain an X and Y zeolite having the silica to alumina ratio and $a_o$ characteristic of the processed X and Y zeolites respectively, as herein described, with sodium expressed as $Na_2O$ based on the exchanged zeolite, volatile free, for example, from less than 0.5% and containing a crystalline phase having "d" spacings corresponding to those of Table 1. The process does not result in any substantial impairment of the crystallinity of the exchanged zeolite and results in replacement of the original sodium content by the exchange cation.

The crystallinity of the exchanged zeolite was substantially the same as the crystallinity of the sodium X (U.S. Pat. No. 2,882,244) or Y (U.S.Pat. No. 3,130,007) employed in the process as evidenced by their x-ray patterns with substantially the same $a_o$ value as the X or Y entering the exchange process and in addition the zeolite contained the "d" spacings of Table 1 which do not correspond to the crystal system of the X or Y which is the host. The resultant product shows excellent thermal and hydrothermal stability.

The preferred catalysts contain an exchanged X or Y zeolite with at least one equivalent of metal cation per gram atom of aluminum, for example about 0.9 or more equivalents of ReO and 0.1 or less equivalents of Na per gram atom of aluminum theortical cation density. The sum of the Na and rare earth oxide (ReO) may be about 1 or more equivalent per gram atom of aluminum in the exchanged product, and preferably when the rare earth cation density is itself of about 1 or more for example between 1 and 2 equivalents per gram atom of aluminum in the exchanged zeolite.

The catalyst is preferably produced by spray drying a slurry of the above zeolite, and a matrix, e.g., containing clay, the slurry composition being such as to give a spray dried product of microspheres of about 50 to 70 micron average diameter.

Unlike the d spacings of the X and Y spectrum which conforms to the cubic system, the d spacings of Table 1 in any of the forms that it appears either in the gel host or the X or Y does not appear to conform to the cubic system of the faujasite type.

EXAMPLE 1

The preferred ammoniated silica-alumina gel is prepared to be processesed according to our invention may be made as follows:

5,017 grams of sodium silicate (28% $SiO_2$-8.9% $Na_2O$ by weight) equivalent to 1,440 grams of $SiO_2$ is dissolved in water. The solution is acidified to a pH of 11 with sulfuric acid; 26,896 grams of an aluminum sulfate solution (equivalent to 1,560 grams of $Al_2O_3$) is added gradually to the acidified slurry with constant agitation.

The pH at the end of the addition of the aluminum sulfate should be in the range of about 3 to about 3.5. The solution is passed through a colloid mill to be well homogenized. The homogenized solution is made alkaline with ammonium hydroxide with constant and vigorous agitation to adjust the mixture to a pH of about 8.5 to about 9.

The mixture is vigorously stirred and the pH is maintained in the range of about 8.5 to about 9 by suitable adjustment for about 1 hour to insure uniformity of the mixture. It is then heated to a temperature of about 75° to 85° C. for about 30 minutes and then immediately filtered and the filter cake washed with hot distilled water of about 80° C. The wash slurry is then slurried to a solid content of about 5% in distilled water which contained about 2% of ammonium nitrate and then filtered. The filter cake is then again slurried with ammonium nitrate solutions as in the last previous step. The filter cake from the last step is again reslurried in an ammonium nitrate solution as above and filtered. The filter cake from the last filtration above is washed with distilled water.

The silica-alumina gel thus produced is preferably maintained in a sealed container prior to use in the catalyst of our invention.

The gel is produced in Example 1 analyzed on a volatile free basis as follows:

| $SiO_2$ | = | 48.7% | by weight |
|---|---|---|---|
| $Al_2O_3$ | = | 51.5% | by weight |
| $Na_2O$ | = | 0.27% | by weight |
| $NH_3$ | = | 3.67% | by weight |

The gel, when subjected to x-ray employing K copper radiation at 500 counts per second in the counter of the x-ray apparatus, showed no discernable peaks and appeared to be amorphous.

EXAMPLE 2

The above cogel was pelleted and tested by a microactivity test identified above after steaming at 1450°F. for two (2) hours (M activity) and again another sample after steaming at 1500° F. for two (2) hours (S+ activity). The results are reported as volume percent conversion. The results obtained were as follows:

|  | M | S | S+ |
|---|---|---|---|
| Volume % conversion | 43.0 | 36.5 | 46 |

The gel was also mixed with acid treated halloysite (see Secor., U.S. Pat. Nos. 2,935,463 and 3,446,727) in the ratio of 90% by weight of the dried gel and 10% by weight of the dry halloysite. The mixture was tested as above with the following results:

|  | M | S+ |
|---|---|---|
| Volume % conversion | 47 | 44 |

The following example illustrates the effect of exchanging with rare earth at temperatures below boiling.

The rare earth sulfate expressed as oxides and symbolized as ReO was composed of the sulfates of lanthanum, cerium, neodymium and other rare earth metals for example praesiodimuma. The equivalent value of the mixture of the above metals, expressed as their oxides (ReO) is 52.74 grams per said equivalent, that is 100 grams of ReO (volatile free) is equal to 1.896 equivalents of ReO.

EXAMPLE 3

1,600 grams of the cogel prepared as in Example 1 (calculated on a volatile free basis) was mixed gradually with 18.4 liters of rare earth sulfate solution containing 1.96% of rare earth oxides ReO while the mixture was maintained at a pH of 5 by adjusting during the mixing. The ratio of the grams ReO per 100 grams of the cogel in a volatile free basis was 22 grams ReO as percent of the weight of the gel. The above slurry was then introduced into an autoclave and heated at a temperature 400° F. for 2 hours indicated in Table 2. The mixture was then cooled and filtered. The filter cake was washed until the wash water appeared substantially free of sulfate ions. The filter cake was analyzed on a volatile free basis. This is equivalent to 0.04 equivalents of $NH_4$ per mole of $Al_2O_3$. The filter cake was analyzed as follows:

| | | | |
|---|---|---|---|
| $SiO_2$ | = | 48.8% | by weight |
| $Al_2O_3$ | = | 45.6% | by weight |
| ReO | = | 4.15% | by weight |
| $NH_3$ | = | 0.3% | by weight |
| $Na_2O$ | = | 0.06% | by weight |
| $SO_3$ | = | 0.67% | by weight |

$Na_2O = 0.06\%$ by weight
$SO_3 = 0.67\%$ by weight.

The cogel treated as stated was mixed with 10% of acid treated halloysite and 90% of the cogel all measure on a volatile free basis as in Example 2 and subjected to the above activity test as set forth in Example 2. The results were as follows:

| | M | S | S+ |
|---|---|---|---|
| Volume % conversion | 77.1% | 61.5% | 55.5% |

The filter cake was x-rayed as in Example 1 and the "d" spacings and intensities (I) of the corresponding lines measured as the height of the peaks on the strip chart were determined.

Table 2

| d | I |
|---|---|
| 6.39 | 6 |
| 6.26 | 24 |
| 4.58 | 3 |
| 3.57 | 3 |
| 3.49 | 3 |
| 3.41 | 2 |
| 3.24 | 2 |
| 3.14 | 3 |
| 3.00 | 10 |
| 2.86 | 3 |
| 2.43 | 2 |
| 2.21 | 6 |

EXAMPLE 4

The temperature and time conditions and other procedures of Example 3 were followed in this example except that the ratio of rare earth sulfate to the gel on a volatile free basis was in the ratio of 10 grams of ReO per 100 grams of the gel, on a volatile free basis.

Five samples were prepared at different durations of digestion but otherwise on the same conditions to wit, sampled after 15 minutes (Sample 1), 35 minutes (Sample 2), 45 minutes (Sample 3), 1 hour (Sample 4), and 2 hours (Sample 5).

The "d" spacings and peak intensities were as shown in Table 3.

The x-ray spectrographs were made under the same conditions employing K alpha copper radiation as in Example 1.

It is noted that although many of the peaks in the spectrum in Table 3, for Samples 1 through 4, are absent from the spectrum of Table 1 and 2, they include the "d" spacings in Table 1 common to Samples 1 through 4 and those of Table 3. The activity of the catalyst while less than that of Example 3 is substantial and higher than that of the original gel.

The "d" spacings of the crystalline phase were as shown in Table 2.

Table 3

| Sample 1 | | Sample 2 | | Sample 3 | | Sample 4 | |
|---|---|---|---|---|---|---|---|
| d | I | d | I | d | I | d | I |
| 14.60 | 2 | | | 14.25 | 2 | | |
| 6.28 | 10 | 6.29 | 48 | 6.29 | 41 | 6.28 | 39 |
| 4.58 | 3 | 4.58 | 5 | 4.58 | 4 | 4.58 | 4 |
| 4.00 | 2 | 4.00 | 2 | 4.00 | 2 | | |
| | | 3.70 | 2 | 3.71 | 2 | | |
| 3.56 | 3 | 3.57 | 4 | 3.58 | 5 | 3.56 | 2 |
| | | 3.50 | 2 | 3.51 | 2 | | |
| | | 3.35 | 2 | | | | |
| 3.24 | 6 | 3.24 | 5 | 3.25 | 3 | 3.24 | 6 |
| 3.14 | 14 | 3.14 | 6 | 3.15 | 3 | 3.14 | 7 |
| 3.01 | 3 | 3.01 | 4 | 3.01 | 4 | 3.01 | 2 |
| 2.97 | 3 | | | 2.97 | 3 | 2.97 | 3 |
| 2.85 | 5 | 2.85 | 4 | 2.84 | 3 | 2.84 | 7 |
| 2.78 | 3 | | | 2.78 | 2 | 2.77 | 1 |

EXAMPLE 5

Example 3 was repeated employing a higher ratio of rare earth sulfate to the cogel. 33 grams, expressed as ReO per 100 grams of the cogel on a volatile free basis was digested for the following periods each at 500° F. One gel was digested and sampled after 8 hours (Sample 1), another after 12 hours (Sample 2), another after 16 hours (Sample 3), another after 20 hours (Sample 4). The filter cakes from each was analyzed and the d spacings and peak intensity was determined as in Example 3 (see Table 4).

The eight hour sample and the 24 hour sample filter cakes were analyzed, with the following results:

| | 8 hours | 24 hours |
|---|---|---|
| $SiO_2$ | 40.6% by weight | 44.6% by weight |
| $Al_2O_3$ | 44.3% by weight | 45.2% by weight |
| ReO | 8.53% by weight | 9.08% by weight |
| $NH_3$ | 0.55% by weight | 1.17% by weight |
| $Na_2O$ | 0.083% by weight | 0.17% by weight |

Table 5 states the "d" spacings and intensities of the x-ray spectrum taken as in Example 1.

Table 4

| Sample 1 | | Sample 2 | | Sample 3 | | Sample 4 | | Sample 5 | |
|---|---|---|---|---|---|---|---|---|---|
| d | I | d | I | d | I | d | I | d | I |
| 14.18 | 3 | | | | | | | | |
| 7.40 | 4 | | | 7.46 | 5 | 7.46 | 5 | | |
| 7.19 | 11 | 7.22 | 13 | 7.22 | 8 | 7.22 | 12 | 7.23 | 14 |
| 6.97 | 1 | 6.99 | 2 | | | | | | |
| | | | | | | | | 6.47 | 10 |
| 6.25 | 38 | 6.26 | 43 | 6.27 | 49 | 6.28 | 44 | 6.30 | 5 |
| 5.89 | 2 | 5.89 | 2 | 5.90 | 2 | | | | |
| | | | | | | | | 4.80 | 12 |
| 4.56 | 16 | 4.56 | 14 | 4.58 | 15 | 4.58 | 16 | | |
| 4.46 | 12 | 4.45 | 16 | 4.48 | 5 | 4.47 | 11 | 4.47 | 24 |
| 4.41 | 2 | | | | | | | | |
| 4.37 | 5 | 4.37 | 5 | 4.38 | 5 | 4.38 | 5 | 4.38 | 7 |
| 4.21 | 5 | | | | | | | | |
| 4.16 | 8 | 4.16 | 7 | 4.17 | 9 | 4.18 | 7 | 4.17 | 10 |
| 4.09 | 5 | 4.10 | 2 | 4.10 | 4 | | | | |
| 3.98 | 14 | 3.99 | 3 | 3.99 | 12 | 3.99 | 9 | | |
| 3.77 | 3 | 3.80 | 3 | 3.82 | 4 | 3.80 | 3 | 3.81 | 5 |
| | | | | 3.61 | | | | 3.68 | 2 |
| 3.56 | 22 | 3.55 | 19 | 3.55 | 19 | 3.55 | 21 | 3.54 | 12 |
| 3.49 | 6 | 3.49 | 5 | 3.49 | 4 | 3.49 | 4 | | |
| | | | | 3.38 | 1 | | | 3.37 | 1 |
| 3.33 | 5 | 3.34 | 4 | 3.33 | 4 | 3.33 | 4 | | |
| 3.23 | 19 | 3.23 | 15 | 3.24 | 14 | | | 3.25 | 4 |

Table 4-continued

| Sample 1 | | Sample 2 | | Sample 3 | | Sample 4 | | Sample 5 | |
|---|---|---|---|---|---|---|---|---|---|
| d | I | d | I | d | I | d | I | d | I |
| 3.15 | 8 | 3.14 | 7 | 3.14 | 10 | 3.14 | 8 | | |
| 3.00 | 20 | 3.00 | 18 | 3.00 | 16 | 3.00 | 15 | 3.00 | 2 |
| 2.96 | 8 | 2.96 | 9 | 2.96 | 10 | 2.97 | 10 | | |
| 2.94 | 3 | 2.94 | 2 | 2.94 | 8 | 2.94 | 3 | 2.92 | 2 |
| 2.88 | 2 | 2.88 | 1 | 2.88 | 1 | 2.88 | 1 | | |
| 2.84 | 18 | 2.84 | 16 | 2.84 | 17 | 2.84 | 19 | 2.84 | 1 |
| 2.77 | 7 | 2.77 | 8 | 2.77 | 7 | 2.77 | 6 | 2.77 | 2 |
| 2.62 | 7 | 2.60 | 5 | 2.61 | 8 | 2.61 | 6 | | |
| 2.56 | 9 | 2.56 | 8 | 2.56 | 8 | 2.56 | 8 | 2.56 | 13 |
| 2.54 | 1 | 2.54 | 2 | 2.53 | 3 | 2.54 | 2 | | |
| 2.51 | 3 | 2.51 | 3 | 2.51 | 4 | 2.51 | 4 | 2.50 | 7 |
| 2.33 | 9 | 2.33 | 11 | 2.33 | 4 | 2.34 | 9 | 2.33 | 13 |
| | | | | 2.31 | 10 | | | | |

The 8 hour sample employed and tested for activity as in Example 2 with the following results:

| 8 hours | M = 53% | S+ = 41% |
|---|---|---|
| 24 hours | M = 46.4% | S+ = 43.1% |

EXAMPLE 6

Digestion of a gel formed according to Example 1 with an acid solution of rare earth cations at 550° F. for 8 hours, resulted in gel which when x-rayed showed the following spectrum.

Table 5

| d (angstroms) | I |
|---|---|
| 6.303 | 12 |
| 4.587 | 6 |
| 4.004 | 5 |
| 3.562 | 4 |
| 3.506 | 2 |
| 3.339 | 2 |
| 3.326 | 3 |
| 3.249 | 8 |
| 3.220 | 3 |
| 3.142 | 3 |
| 3.008 | 4 |
| 2.969 | 2 |
| 2.950 | 1 |
| 2.885 | 1 |
| 2.849 | 7 |
| 2.780 | 3 |
| 2.614 | 2 |

The following examples illustrate the formation of the novel crystal phase of Table 1 in the so called faujasite type zeolites to wit the X and Y crystalline alumino silicates referred to above. The alpha crystalline phase appears when the above crystalline alulmino silicates are hydrothermally treated under the conditions which in the case of ammoniated cogel produces the same crystalline phase. We have in the copending applications Ser. No. 718,167, Ser. No. 808,268, and Ser. No. 869,856 described procedures for treatment of the above complexes and especially in the form of the crystalline alumino silicates of the faujasite type by solutions of rare earth cations. We have also observed that when the treatement is under the above autogenous superatmospheric pressure in the presence of rare earth cations that a crystal phase which is not present in the faujasite subjected to such treatment is developed in the treated faujasite and that the sodium ion content of the faujasite is largely replaced by rare earth cations.

The phenomena of the increase of the catalytic activity observed in the case of the treated gel is also observed in the case of the treated faujasite.

Thus in the case of the X faujasite the crystal planes corresponding to the "d" spacings of Table 1 appear in the x-ray spectrum. A similar result is obtained when a Y faujasite is similarly treated. The crystal phase of Table 1 appears in the treated Y. The X and the Y thus become hosts for the new crystal phase which we have denominated as "alpha".

The "d" spacings of Table 1 which appears in the spectrum of the X and Y do not conform to the cubic system of the faujasite type X or Y.

In order to distinguish the gel host and the crystalline alumina-silicate hosts for alpha complex we designated the class of the (Si, Al)O$_4$ complexes which are hosts to the alpha crystal phase as alpha gel, and where the host is a crystalline alumino silicate will be differentiate the particular crystalline alumino silicate which contains the crystal phase of Table 1 by a prefix, "alpha", for example, alpha X or alpha Y. The x-ray patterns which identify X are given in the above Milton Patent and also in Breck, supra at page 369; and as to the Y, by the above Breck U.S. Patent and Breck, supra, page 369 (see also pages 93, et seq).

We define as alpha X and alpha Y respectively as those having x-ray patterns comforming to the patterns for X and Y as above and whose x-ray contains also reflections corresponding to the "d" spacings according to Table 1, and which are distinguishable from the spacings characteristic of the host faujasite type zeolites, i.e. X or Y. The following examples illustrate our invention relating to alpha X and alpha Y.

The sodium zeolite which is used in the following Example 6 had the following x-ray spectrum, in terms of a "d" spacing (see Table 6). The exchanged zeolite containing the alpha crystalline phase had "d" spacings as in Table 6. For purposes of comparison, the "d" spacings and analysis of and exchanged Y exchanged at atmospheric pressures according to Example 7 is also given in Table 6.

EXAMPLE 7

400 grams (volatile free basis) of a NaY (13% Na$_2$O, (see Table 6) was slurried in water and mixed with rare earth sulfate solution. 252 grams of rare earth sulfate were dissolved in 19,600 ml of H$_2$O. The composition of the rare earth was such that the ratio of the equivalents of rare earth per equivalent of Na in the zeolite in the reaction mixture was 2.8. The solution was slowly added to the zeolite slurry and the pH was maintained at a pH of 5 to 5.5 during the addition by addition of diluted H$_2$SO$_4$. After the rare earth sulfate had been added, the resultant slurry mixture was autoclaved for a period of 3 hours at a temperature of 335° F. The product was filtered and washed substantially free of sulfate ion.

The product analyzed as follows:
Na$_2$O = 0.35%
Al$_2$O$_3$ = 22.7%
SiO$_2$ = 56.7%
ReO = 19.7%
SO$_3$ = 0.26%

It was x-rayed, see Table 5.

The exchanged zeolite was formulated by mixing the zeolite and alumina and clay in a slurry and spray drying the slurry as follows:
ReO exchanged zeolite = 19% pseudoboehmite (hydrated alumina)=18%
acid treated halloysite=16%
ball clay=47%
Tested by the above microactivity test it gave the following results:

|  | M | S | S+ |
|---|---|---|---|
| Conversion % | 79.6 | 73.3 | 67.9 |

EXAMPLE 8

A comparison may be made with the product produced by multiple exchange of the above sodium Y at atmospheric pressure at high temperatures below the boiling point.

The sodium Y, as described above, was mixed with rare earth sulfate solution as above. The mixture was adjusted to a pH of 3.5 and held for one (1) hour at an ambient temperature and then for two (2) hours at 160° at an atmospheric pressure. The zeolite was filtered and washed until the wash water was sulfate free. The filter cake was mixed with additional rare earth sulfate solution and the pH was adjusted to 3.5 and held for two (2) hours at 160° F. under atmospheric pressure, filtered and washed as above.

The filter cake was analyzed. The rare earth content (ReO) was 18.3% and the $Na_2O$ content was 1.02% on a volatile free basis. The x-ray pattern showed "d" spacings as in Table 6.

Table 6

| | Na Y | | ReO Y (Example 7) | | ReO Y (Example 6) | |
|---|---|---|---|---|---|---|
| N | d (Angstroms) | I | d (Angstroms) | I | d (Angstroms) | I |
| 3 | 14.26 | 100+ | 14.20 | 100+ | 14.14 | 42 |
| 8 | 8.72 | 45 | 8.71 | 6 | 8.71 | 4 |
| 11 | 7.41 | 33 | 7.40 | 3 | | |
| | | | 7.11 | 26 | 7.11 | 19 |
| | 6.86 | 4 | | | | |
| | 6.56 | 1 | 6.17 | 3 | 6.26 | 29 |
| | 6.19 | 3 | | | | |
| 19 | 5.662 | 100+ | 5.66 | 72 | 5.662 | 60 |
| | 5.039 | 5 | | | | |
| 27 | 4.758 | 60 | 4.75 | 45 | 4.745 | 39 |
| | 4.506 | 2 | | | 4.575 | 8 |
| 32 | 4.364 | 100+ | 4.36 | 17 | 4.364 | 11 |
| | 4.181 | 5 | | | | |
| 35 | | | 4.17 | 5 | 4.171 | 3 |
| | | | 4.12 | 6 | 4.095 | 5 |
| | | | | | 3.986 | 3 |
| 40 | 3.90 | 26 | 3.90 | 2 | 3.909 | 3 |
| 43 | 3.762 | 100+ | 3.76 | 71 | 3.762 | 67 |
| | 3.648 | 2 | | | | |
| 48 | 3.562 | 10 | | | 3.562 | 8 |
| | | | | | 3.493 | 5 |
| 51 | 3.460 | 21 | 3.45 | 18 | 3.453 | 15 |
| | | | | | 3.427 | 1 |
| 56 | 3.296 | 100+ | 3.30 | 42 | 3.302 | 35 |
| | | | 3.21 | 5 | 3.238 | 9 |
| 59 | 3.215 | 23 | | | 3.22 | 6 |
| | | | | | 3.142 | 5 |
| 67 | 3.018 | 38 | 3.01 | 7 | 3.008 | 12 |
| | 2.969 | 2 | | | 2.969 | 8 |
| 72 | 2.908 | 54 | 2.91 | 22 | 2.912 | 14 |
| 75 | 2.849 | 100+ | 2.85 | 27 | 2.849 | 22 |
| 80 | 2.759 | 41 | 2.76 | 26 | 2.763 | 22 |
| 83 | 2.710 | 13 | 2.71 | 7 | 2.714 | 5 |
| 88 | 2.638 | 35 | 2.63 | 18 | 2.637 | 15 |
| | | | | | 2.607 | 3 |
| 91 | 2.589 | 20 | 2.59 | 8 | 2.592 | 5 |
| | | | | | 2.542 | 3 |
| | 2.522 | 4 | | | | |
| 96 | | | 2.52 | 5 | 2.522 | 3 |
| | 2.423 | 5 | | | | |
| 99 | | | 2.48 | 3 | | |
| | | | | | 2.488 | 2 |
| | 2.377 | 27 | | | | |
| 104 | | | 2.42 | 7 | 2.423 | 4 |
| | | | | | 2.392 | 7 |
| 108 | | | | | 2.380 | 10 |

EXAMPLE 9

500 grams of a sodium X zeolite had the following anhydrous molar composition: $Na_2O:Al_2O_3:2.5\ SiO_2$, having a x-ray pattern as in Table 6, and, containing 19.7% $Na_2O$ was dispersed at 3,000 milliliters of water. The dispersed zeolite was titrated to a pH of 8.0 with a 25% sulfuric acid solution. The slurry was filtered and washed. A rare earth sulfate solution was prepared by dissolving the above rare earth sulfate in water and diluted to 13,000 milliliters by dilution. The weight of the rare earth sulfate employed is sufficient to provide 54 grams of ReO per 100 grams of the sodium X on a volatile free basis. The zeolite filter cake produced as above was dispersed in the rare earth sulfate solution adding it at the rate to maintain the pH in the range of about 5 to about 6. The mixture was having a pH of 61 then introduced into the autoclave and heated to the temperature specified in each of the example for four (4) hours at 338° F. therein specified. After the elapse of time the slurry was cooled, filtered and washed sulfate free.

The zeolite analyzed as followed:
$Na_2O$=0.315% by weight
ReO=33.5% by weight
$SiO_2$=37.0% by weight
$Al_2O_3$=27.5% by weight The "d" spacings derived from the x-ray spectrum of the exchanged zeolite is stated in Table 7, as is also the "d" spacings of according to the x-ray spectrum of the sodium X.

The zeolite exchanged as described above was incorporated into a matrix such as has been employed in the prior commercial catalyst. The matrix was produced as follows.

A hundred grams of hydrated alumina, (pseudoboehmite) was peptized with 1.057 liters of water per hundred grams of alumina to which had been added 9.5 milliliters of 100% formic acid per 1.057 liters with moderate stirring for about thirty minutes. To this mixture was added 309.5 grams of ball clay pr 100 grams of alumina on a volatile-free basis and 100 grams of acid treated halloysite on a volatile-free basis, per 100 grams of alumina referred to above and the mixture was vigorously stirred for about fifteen minutes. To the resultant mixture was added the exchange zeolite produced as above in the proporations as specified in each of the examples with vigorous agitation. The mixture was spray dried to give particles of about 70 micron average diameter and containing about 15% volatile matter.

The catalyst tested by the above microactivity test gave the following average results:

| M | S | S+ |
|---|---|---|
| 70% | 64% | 34% |

EXAMPLE 10

In Example 10, the sodium X of Example 9 was exchanged at ambient pressure with rare earth sulfate, with the acidity adjusted as in Example 9. The mixture was maintained at a temperature of 180° to 200° F. for two (2) hours, filtered and washed.

At the first exchange, the sodium expressed as $Na_2O$ was 7.85% on a volatile free basis. The washed filter cake was reexchanged as described above and washed. The filter cake analyzed on a volatile free basis was as follows:

$Na_2O$ = 2.43%
ReO = 25.5%

When compounded with the matrix of Example 9, the activity was determined as above as follows:

M = 65%
S+ = 21%

The "d" spacings as determined from the x-ray pattern of the exchanged zeolite is given in Table 7.

Table 7

| | Na X | | ReO X (Example 9) | | ReO X (Example 8) | |
|---|---|---|---|---|---|---|
| N | d (Angstroms) | I | d (Angstroms) | I | d (Angstroms) | I |
| 3 | 14.37 | 100+ | 14.26 | 100+ | 14.37 | 32 |
|   |       |      | 8.80  | 9    |       |    |
| 8 | 8.80  | 50   |       |      |       |    |
| 11 | 7.53 | 27   |       |      | 7.141 | 12 |
|    |      |      |       |      | 7.03  | 1  |
|    |      |      |       |      | 6.259 | 43 |
| 19 | 5.735 | 48  | 5.75  | 2    | 5.735 | 41 |
|    |       |     |       |      | 5.096 | 1  |
| 27 | 4.809 | 15  | 4.809 | 9    | 4.796 | 11 |
|    |       |     |       |      | 4.564 | 8  |
| 32 | 4.418 | 27  | 4.407 | 11   |       |    |
| 35 | 4.22  | 5   | 4.21  | 6    | 4.22  | 3  |
|    |       |     | 4.15  | 23   |       |    |
| 36 |       |     |       |      | 4.162 | 2  |
|    |       |     |       |      | 4.095 | 1  |
| 40 | 3.952 | 10  |       |      | 3.978 | 7  |
| 43 | 3.81  | 71  | 3.802 | 63   | 3.81  | 44 |
| 44 | 3.77  | 11  | 3.77  | 8    | 3.77  | 6  |
| 48 | 3.604 | 2   |       |      | 3.604 | 3  |
|    |       |     |       |      | 3.555 | 6  |
| 51 | 3.493 | 2   | 3.50  | 8    | 3.50  | 10 |
| 56 | 3.339 | 53  | 3.3326 | 13  | 3.339 | 24 |
| 59 | 3.255 | 3   | 3.249 | 14   | 3.238 | 7  |
|    |       |     | 3.116 | 7    | 3.137 | 5  |
| 62 | 3.053 | 11  |       |      |       |    |
|    |       |     | 3.023 | 11   | 3.058 | 1  |
|    |       |     |       |      | 3.028 | 1  |
|    |       |     |       |      | 3.003 | 8  |
| 71 |       |     | 2.94  | 19   | 2.969 | 8  |
| 72 | 2.945 | 27  |       |      | 2.945 | 12 |
| 75 | 2.885 | 67  | 2.88  | 7    | 2.885 | 18 |
|    |       |     |       |      | 2.836 | 11 |
| 80 | 2.793 | 20  | 2.79  | 8    | 2.792 | 26 |
|    |       |     |       |      | 2.772 | 4  |
| 83 | 2.743 | 5   | 2.738 | 17   |       |    |
| 88 | 2.66  | 36  | 2.66  | 4    | 2.663 | 17 |
| 91 | 2.67  | 8   | 2.614 | 11   | 2.622 | 9  |
| 96 | 2.55  | 4   | 2.55  | 2    | 2.55  | 11 |
|    |       |     | 2.508 | 6    | 2.515 | 2  |
| 104 | 2.449 | 1  | 2.445 | 10   | 2.449 | 3  |
| 108 | 2.40 | 11  |       |      | 2.417 | 5  |
| 123 | 2.25 | 3   |       |      | 2.254 | 3  |

Summerizing the data of Tables 6 and 7 it appears that the introduction of the ReO cations into either the X or Y at either atmospheric or pressure exchange makes no significant change in the d spacings. The X Y shift of the sodium forms and the atmospheric exchanged forms are both:

| Na X | = | 24.99 | Average |
|---|---|---|---|
| Na Y | at | 24.96 | |

It will be observed that the crystalline phase formed by the various procedures by which an ammoniated silica-alumina gel is digested under superatmospheric pressure in the presence of a solution of rare earth cations result in a crystalline phase in the gel host characterized by reflections from copper K alpha radiation in which are found the following reflections which expressed as d spacings in Angstroms are as follow.

Summarizing Tables 1–5 that is the crystalline phase present in the gel hosts and formed under the various conditions detailed in the Examples 1–6, the experimental values of the d spacings vary over a very narrow range, well within experimental error.

Table 8

| Range | Average | Range | Average |
|---|---|---|---|
| 14.18–14.60 | 14.34±0.22 | 3.54–3.58 | 3.56±0.01 |
| 7.40–7.46 | 7.44±0.03 | 3.49–3.51 | 3.54±0.01 |
| 7.19–7.23 | 7.22±0.02 | 3.33–3.34 | 3.34±0.01 |
| 6.97–6.99 | 6.98±0.01 | 3.23–3.25 | 3.24±0.01 |
| 6.25–6.30 | 6.28±0.02 | 3.14–3.16 | 3.14±0.01 |
| 5.89–5.94 | 5.89±0.01 | 3.00–3.01 | 3.00±0.01 |
| 4.56–4.58 | 4.58±0.01 | 2.96–2.97 | 2.97±0.005 |
| 4.16–4.18 | 4.17±0.01 | 2.91–2.98 | 2.94±0.01 |
| 4.09–4.10 | 4.095±.005 | 2.88–2.89 | 2.88±0.004 |
| 3.98–4.00 | 3.99±0.01 | 2.84–2.86 | 2.84±0.007 |
| 3.77–3.82 | 3.80±0.02 | | |

Not all of these reflections appear in each formulation but the following d spacings are common to all of the spectrum and may be considered as characteristics of the crystalline phase generated under the above conditions and for identification we refer to such a crystalline phase as alpha. Whereas not all of the d spacings are found in all of the crystallized gel, the following d spacings appear common to all of the crystallized gels tabulated above.

It has also been observed that the same crystalline phase is formed in the similar treatment of faujasite crystalline alumino silicates as is evidenced by the x-ray spectra of the above examples.

Observing the above faujasite spectra, it will be seen that except for the following reflecting expressed as d spacings, the d values of the rare earth exchanged X do not differ by more than about 0.3–0.4% whereas the conventional X-Y shift of 1.2% is observed for the normal faujasite lines.

Only in the case of the following reflections is the shift not conventional with the expected X-Y shift. These reflections are as follows:

| NaX ave. $a_o$ = 24.99 | NaY ave. $a_o$ = 24.69 |
|---|---|
| ReOX (at) ave. $a_o$ = 24.96 | ReOY (at) ave. $a_o$ = 24.67 |
| ReOX (P) ave. $a_o$ = 25.00 | ReOY (p) ave. $a_o$ = 24.70 | i.e., a shift of −1.2% of the X value.

In obtaining the averages, all X and Y d values which did not participate in the shift were excluded from the calculation of the $a_o$.

These "d" spacings are tabulated in Table 9, are the characteristic d spacings of the alpha crystalline phase in the crystallized gel as tabulated above. (Calculated $a_o$ for N of the system of Tables 6 and 7).

Table 9

| XReO (pressure) d (Angstroms) | YReO (pressure) | % d shift |
|---|---|---|
| 6.26 | 6.26 | 0.0% |
| 4.56 | 4.58 | 0.4% |
| 3.98 | 3.99 | 0.3% |
| 3.77 | 3.76 | −0.3% |
| 3.55 | 3.56 | 0.3% |
| 3.50 | 3.49 | −0.3% |
| 3.238 | 3.238 | 0.0% |
| 3.137 | 3.142 | 0.2% |
| 3.033 | 3.008 | 0.2% |
| 2.969 | 2.969 | 0.0% |
| 2.836 | 2.849* | 0.5% |

*This peak overlaps N = 75 peak for faujasite Y.

All of the above reflections are found in the alpha crystalline phase in the gel host of Table 7.

None of the above reflections (other than 2.849) will conform in the faujasite system since they will not, based on the $a_o$ of the X or Y of the experiment, yield a permissable $h^2+k^2+l^2$ value, nor participate in the required X-Y $a_o$ or d shift resulting from the difference in the $SiO_2/Al_2O_3$ ratio.

The conclusion is that the alpha phase is a unique crystalline phase which when generated in the gel or faujasite host is accompanied by a significant improvement in the catalytic activity of the host.

The alpha crystalline phase is thus a separately identifiable novel composition of matter.

The presence of the alpha crystalline phase in the host thus acts to substantially improve the catalytic activity of the host and thus forms a separately identifiable gel and separately identifiable faujasite (Si, Al)$O_4$ system having the important utility as an active cracking catalyst.

For purpose of identification, the gel containing the alpha crystalline phase is referred to as an alpha silica-alumina cogel and the faujasite for example X or Y as alpha faujasite, i.e. alpha X and alpha Y.

The preferred alpha phase is that of Example 3 and the preferred composition of matter where the composition is desired for catalytic purposes is the alpha gel of Example 3 and where the catalyst is to be based on crystalline alumino silicate, alpha Y of Example 7.

We claim:

1. A process of forming a host (SiAl)$O_4$, alumino silicate complex containing an in situ generated crystalline phase characterized by d spacings of Table 1 not present in the said host which comprises heating a silica alumina gel in the presence of an acid solution of rare earth cations at an autogenous superatmospheric pressure above about 250° F. and generating said crystalline phase in said host.

2. A process of claim 1 in which the silica-alumina gel complex is an amorphous ammoniated silica-alumina gel containing $NH_4$ ions associated with the gel in an amount substantially in excess of about 0.3 equivalents per mole of alumina ($Al_2O_3$), and having a $SiO_2/Al_2O_3$ molar ratio in the range of about 1 to less than 3 with an acid solution of rare earth cations under autogenous superatmospheric pressure and/or at a temperature above about 250° F. and reducing the $NH_4$ associated with the gel to substantially less than 0.3 equivalents per mole of $Al_2O_3$ in the gel and generating a crystalline phase with the d spacings of Table 1 in said amorphous gel.

3. The process of an hydrotreating a silica-alumina gel having a $SiO_2/Al_2O_3$ molar ratio of more than about 1 and less than about 2.5 and associated with sodium ions expressed as $Na_2O$ of substantially less than about 1% based on the gel on a volatile free basis and containing ammonium cations substantially in excess of 2 equivalents per mole of $Al_2O_3$ treating said ammoniated gel by heating said gel in a solution containing polyvalent cations at a temperature in excess of about 250° F. or reduce the $NH_4$ in the gel to less than about 0.1 equivalents of $NH_4$ per mole of $Al_2O_3$ in the treated gel and generating a crystalline phase with the d spacings of Table 1 in said gel.

4. A process for hydrotreating an ammoniated silica-alumina gel containing $NH_4$ ions associated with the gel in an amount, substantially in excess of about 0.3 equivalents per mole of alumina ($Al_2O_3$), and having a $SiO_2/Al_2O_3$ molar ratio in the range of more than about 1 and less than 3, heating gel at a temperature of from about 250° F. to about 450° F. in with an acid solution of a polyvalent cation, and reducing the $NH_4$ associated with the gel to substantially less than 0.3 equivalents per mole of $Al_2O_3$ in the gel and generating a crystalline phase with the d spacings of Table 1 in said gel.

5. The process of claims 1, 2, 3, or 4, in which the crystalline phase is characterized by the d spacings of Table 1 and also by at least some of the d spacings of Table 8 not in Table 1.

6. A crystalline composition of matter consisting essentially of alpha crystalline complex characterized by d spacing corresponding substantially to the d spacings of Table 1 and containing in addition at least some of the d spacings of Table 8 not present in Table 1.

7. A composition of matter comprising in combination a host (SiAl)$O_4$ silica-aluminate complex in tetrahedral coordination in combination with a crystal phase characterized by d spacings of Table 1 which are not present in silicate-aluminae host.

8. The composition of matter of claim 7, in which the d spacings of the crystal phase contains in addition to the d spacings of Table 1, at least some of the spacings of Table 8.

9. A cracking catalyst comprising the composition of claims 6, 7, or 8, and a matrix.

10. The composition of claim 7 in which the host is a silica-alumina gel.

11. The composition of claim 9, in which the $SiO_2/Al_2O_3$ molar ratio of the gel is about 1 to about 3.

12. The composition of claim 9, in which the crystal phase is characterized by d spacings of Table 1 and in addition at least some of the d spacings of Table 8.

13. The composition of claim 11, in which the gel is an ammoniated gel containing ammonium ion in amount of less than about 0.3 equivalents per mole of $Al_2O_3$.

14. The composition of claim 13, in which the $SiO_2/Al_2O_3$ molar ratio of the gel is about 1 to about 3.

15. The composition of claim 14, in which the gel is an ammoniated gel containing ammonium ion in amount less than about 0.3 equivalents per mole of $Al_2O_3$.

* * * * *